Feb. 27, 1923.
R. P. U. PARNELL
VAPORIZER FOR GASOLINE ENGINES
Filed Apr. 12, 1920
1,446,721
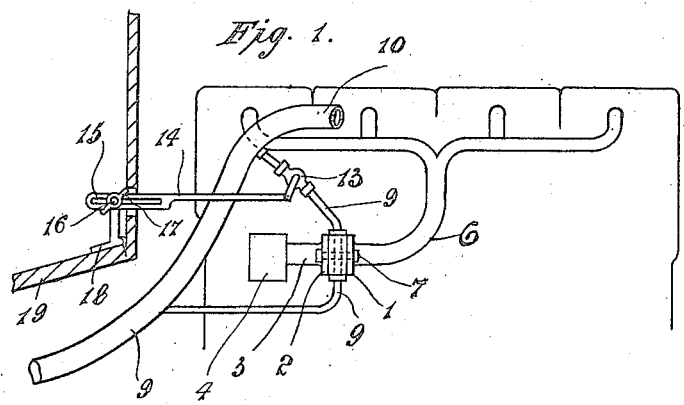
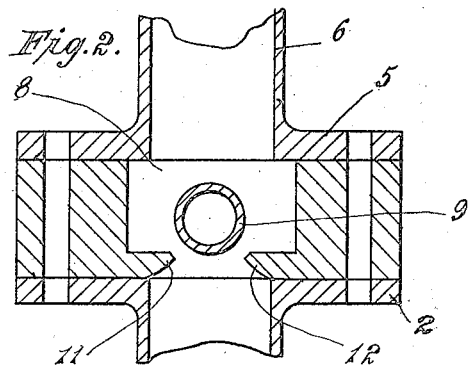
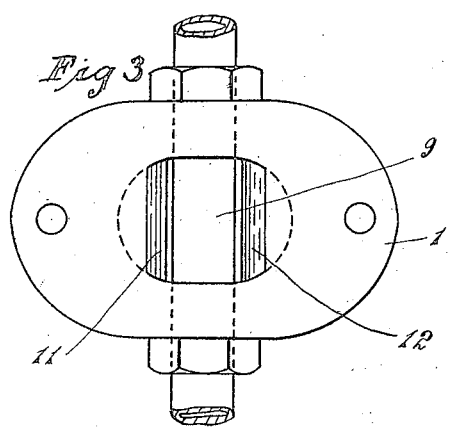
Inventor:
Reginald Percy Urwin Parnell
By Lawrence Langner
Attorney.

UNITED STATES PATENT OFFICE.

REGINALD P. U. PARNELL, OF WELLINGTON, NEW ZEALAND.

VAPORIZER FOR GASOLINE ENGINES.

Application filed April 12, 1920. Serial No. 373,207.

*To all whom it may concern:*

Be it known that I, REGINALD PERCY URWIN PARNELL, a subject of the King of Great Britain and Ireland, residing at Number 3 Tirangi Road, South Kilbirnie, Wellington, New Zealand, have invented a new and useful Improvement in Vaporizers for Gasoline Engines; and I do hereby declare the following to be a full, clear, and exact description of the same.

This invention relates to an improved means for vaporizing fuel mixture for gasoline engines, and to means for controlling the same.

According hereto, a casing member is inserted between the flanged ends of the intake pipe leading from the carburetter to the engine. In the central portion of the member is an opening by means of which the mixture can pass through from one portion of the intake pipe to the other portion. A heating pipe from the exhaust manifold passes through the opening whereby the gasoline particles, passing through the member, are thoroughly vaporized. The member is so formed as to ensure that the fuel mixture will be directed on to the pipe thereby effecting better vaporization.

The invention is illustrated in the accompanying drawings, in which:—

Figure 1, is a diagrammatic view showing the general method of arrangement of the device upon a motor car engine.

Figure 2, is a sectional view through the member.

Figure 3, is an elevation thereof.

Referring to the drawings, a member 1 is inserted between the flange 2 of the pipe 3 leading from the carburetter 4 and the flange 5 of the induction pipe 6 and secured between the two flanges by bolts 7. The centre of the member is provided with a suitable opening 8 and through this opening a heating pipe 9 is passed. This heating pipe 9 is connected to the main exhaust pipe 10 and after passing through the member 1 returns to the exhaust pipe as shown in Figure 1. The opening 8 has tongues 11 and 12 converging towards the pipe 9 in order to direct the flow of mixture upon such pipe. The mixture passing from the carburetter to the induction pipe passes around the heating pipe and is thereby heated and vaporized.

The flow of exhaust gas through the pipe 9 may if desired be controlled by a valve 13 the plug of which is connected to a lever to which is connected a control rod 14 as shown in Figure 1 the end of the rod having a slot 15 passing over a bolt 16 controlled by a thumb screw 17 upon a bracket 18 fixed to the floor 19 of a motor car.

What I claim is:— device of the class described, the combination of a carburetter; an inlet manifold; a member interposed between the carburetter and the inlet manifold having a passage through which the mixture from the carburetter passes to the inlet manifold; an exhaust pipe; a heating pipe connected to different parts of the exhaust pipe and passing through the passage in said member whereby the mixture from the carburetter is heated in said member; and opposite tongues formed on said member and extending into said passage for restricting the latter and directing the flow of the mixture over said heating pipe.

In testimony whereof, I have signed my name to this specification in the presence of two subscribing witnesses.

R. P. U. PARNELL.

Witnesses:
  SYDNEY H. HIGGS,
  ELLA MAHONY.